US008430522B2

(12) United States Patent
Ford et al.

(10) Patent No.: US 8,430,522 B2
(45) Date of Patent: Apr. 30, 2013

(54) LIGHT STICK, HOLSTER AND SHADE

(75) Inventors: Timothy D. F. Ford, Beaconsfield (CA); Stephen Mark Stritzinger, Riverview, FL (US)

(73) Assignee: The Flewelling Ford Family Trust, Beaconsfield (CA)

( * ) Notice: Subject to any disclaimer, the term of this patent is extended or adjusted under 35 U.S.C. 154(b) by 594 days.

(21) Appl. No.: 12/268,348

(22) Filed: Nov. 10, 2008

(65) Prior Publication Data

US 2009/0135617 A1 May 28, 2009

Related U.S. Application Data

(60) Provisional application No. 60/986,693, filed on Nov. 9, 2007.

(51) Int. Cl.

*F21V 21/108* (2006.01)
*F21V 33/00* (2006.01)
*F21V 15/00* (2006.01)
*F21L 4/00* (2006.01)
*H04M 1/22* (2006.01)

(52) U.S. Cl.

USPC ........... 362/108; 362/109; 362/190; 362/191; 362/376

(58) Field of Classification Search .................. 362/108, 362/109, 190, 191, 376

See application file for complete search history.

(56) References Cited

U.S. PATENT DOCUMENTS

| | | | | |
|---|---|---|---|---|
| 3,861,072 | A * | 1/1975 | Holcombe | 43/17.6 |
| 3,876,970 | A * | 4/1975 | Schweitzer | 362/205 |
| 3,934,539 | A * | 1/1976 | Little et al. | 116/63 P |
| 4,768,136 | A * | 8/1988 | Tashjian | 362/84 |
| 5,440,465 | A * | 8/1995 | Hasness | 362/191 |
| 5,893,629 | A * | 4/1999 | Gubernick | 362/186 |
| 6,217,187 | B1 * | 4/2001 | Demsko | 362/84 |
| 6,305,819 | B1 * | 10/2001 | Chen | 362/186 |
| 6,461,018 | B1 * | 10/2002 | Chanslor | 362/249.16 |
| 6,619,808 | B1 * | 9/2003 | Pelto | 362/34 |
| 7,059,740 | B2 * | 6/2006 | Opolka | 362/119 |
| 7,311,261 | B1 * | 12/2007 | Kennedy et al. | 235/462.22 |
| 7,438,428 | B2 * | 10/2008 | Schrimmer et al. | 362/34 |
| 2007/0247843 | A1 * | 10/2007 | Schrimmer et al. | 362/231 |

* cited by examiner

*Primary Examiner* — David J Makiya
(74) *Attorney, Agent, or Firm* — Goudreau Gage Dubuc; Hugh Mansfield

(57) ABSTRACT

A holster and shade used to protect a light stick as well as act as a support therefor. The holster comprises a hollow tubular sheath dimensioned to protect the entire length of the light stick placed therein when in a stored position. When illumination is desired, the light stick is extracted from the holster sheath, reversed, and inserted into the holster, which then supports the light stick with a lens thereof exposed for providing the required illumination.

25 Claims, 4 Drawing Sheets

32
34
10
14
12

LIGHT STICK, HOLSTER AND SHADE

CROSS REFERENCE TO RELATED APPLICATIONS

This application claims priority on U.S. Provisional Application No. 60/986,693, filed on Nov. 9, 2007 and which is herein incorporated by reference in its entirety.

FIELD OF THE INVENTION

The present invention relates to a light stick, holster and shade. In particular the present invention relates to a tubular sheath which both protects the light stick and may also act as a support. A shade for a light stick is also disclosed.

BACKGROUND OF THE INVENTION

The prior art teaches a plurality of holders, holsters, wand attachments, and the like used to provide support to light sticks used in visual signalling applications. However, a common problem encountered in use of light sticks is the shortened life span of the light stick due to usage in hostile and rugged environments, in which the light stick is exposed to manual battering as well as the natural elements. Typically, conventional holder assemblies for light sticks do not enable the latter to be conveniently retrievably stored for later re-use.

What is therefore needed, and an object of the present invention, is an improved light stick holster, which easily enables the light stick to be protected when not in use as well as be effectively supported when illumination is desired.

SUMMARY OF THE INVENTION

In order to address the above and other drawbacks, there is provided in accordance with the present invention a holster for holding a light stick providing visual signalling, the light stick comprising a handle portion and a light emitting tube portion attached to the handle portion. The holster comprises a hollow tubular body with at a forward end thereof an opening adapted to receive therein the light stick such that the light stick is retained within the opening at the handle portion in a selected one of a stored position and a reversed light-emitting position. In the stored position, the body is accommodated over the tube portion and in the light-emitting position, the tube portion is exposed and extends away from the forward end.

In accordance with the present invention, there is also provided a holder for a light stick, the light stick comprising a handle portion and a light emitting tube portion attached to the handle portion. The holder comprises a hollow tubular body with at a forward end thereof an opening adapted to receive therein the light stick such that the light stick is retained within the opening at the handle portion in a selected one of a stored position and a reversed light-emitting position. In the stored position, the body is accommodated over the tube portion and in the light-emitting position, the tube portion is exposed and extends away from the forward end.

Still in accordance with the present invention, there is also provided a holster assembly for holding a light stick providing visual signalling, the light stick comprising a handle portion and a light emitting tube portion attached to the handle portion. The holster assembly comprises a hollow tubular body with at a forward end thereof an opening adapted to receive therein the light stick such that the light stick is retained within the opening at the handle portion with the tube portion exposed and extending away from the forward end and an open-ended tubular light shade adapted to be fitted over the exposed tube portion, the shade comprising an elongate aperture formed on an outer surface thereof for directing light emitted by the tube portion through the aperture.

Still in accordance with the present invention, there is also provided a light stick holster kit comprising a light stick comprising a handle portion and a light emitting tube portion attached to the handle portion. The kit also comprises a hollow tubular body with at a forward end thereof an opening adapted to receive therein the light stick such that the light stick is retained within the opening at the handle portion, the light stick releasably insertable into the opening in a selected one of a stored position where the body is accommodated over the tube portion and a reversed light-emitting position where the tube portion is exposed and extends away from the forward end. The kit further comprises an open-ended tubular light shade adapted to be fitted over the exposed tube portion when the light stick is in the light-emitting position, the shade comprising an elongate aperture formed on an outer surface thereof for directing light emitted by the tube portion through the aperture.

BRIEF DESCRIPTION OF THE DRAWINGS

Reference will now be made to the accompanying drawings, showing by way of illustration, illustrative embodiments of the present invention, and in which.

DESCRIPTION OF THE ILLUSTRATIVE EMBODIMENTS

Figure 1:
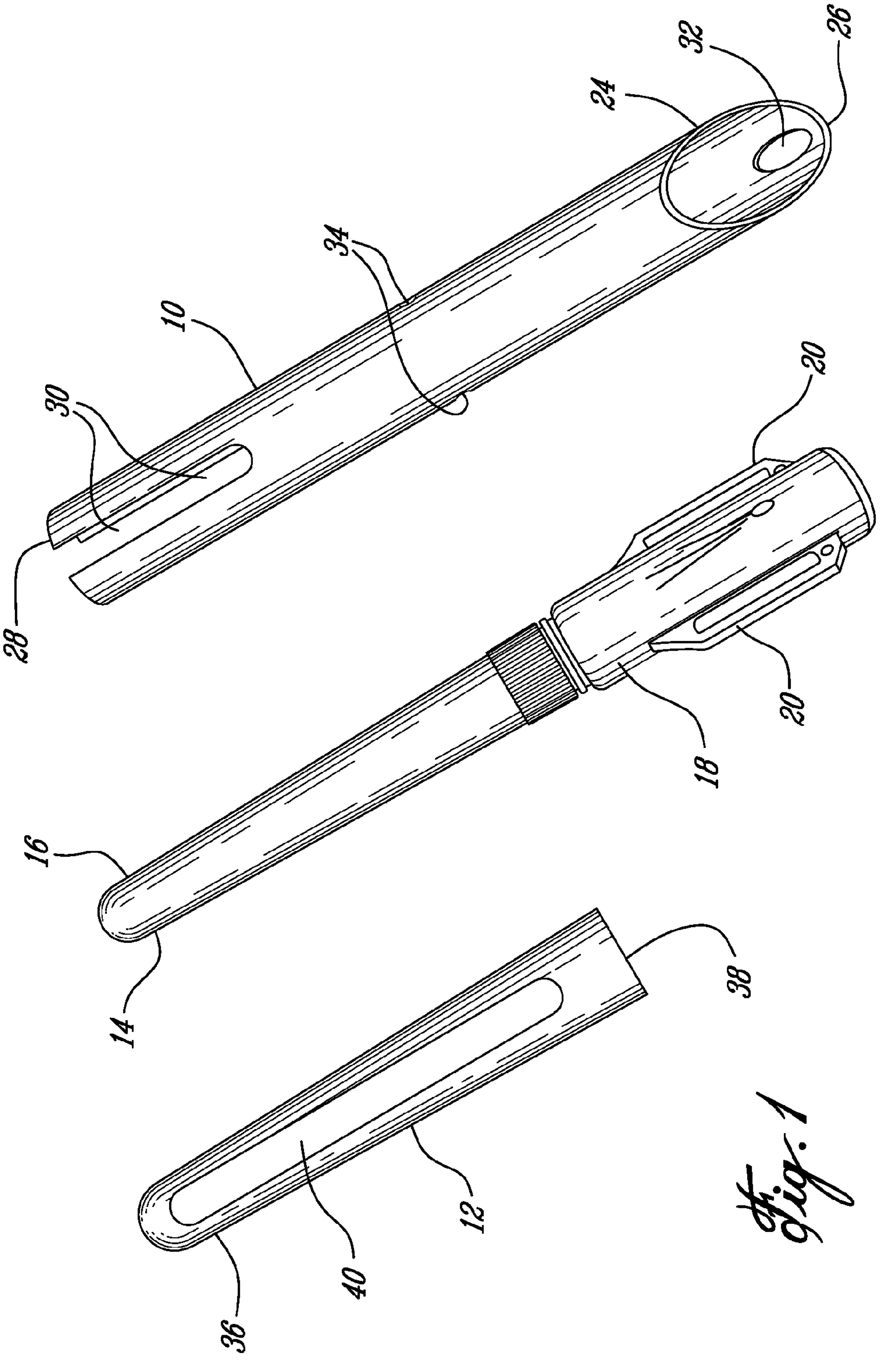
FIG. 1 provides a side plan view of a light stick, light stick holster and shade in accordance with an illustrative embodiment of the present invention.

Referring now to FIG. 1, a holster, generally referred to using the reference numeral 10, and a shade, generally referred to using the reference numeral 12, will now be described along with a light stick 14 used in visual signalling applications and the like. As known in the art, a light stick 14 comprises a transparent or translucent light emitting tube portion or lens 16 surrounding a source of illumination such as an LED or the like which are driven by a battery (all no shown). The battery is typically housed within a handle portion (or handle) 18 of the light stick 14, which may further comprise belt loops as in 20 as well as a mechanism (not shown) for switching the source of illumination on and off.

Still referring to FIG. 1, the holster 10 is comprised of an elongate hollow tubular body 22 dimensioned to receive the lens 16 and handle 18 of the light stick 14 within. The holster 10 is manufactured from a rigid and strong material such aluminium or plastic and is of sufficient length such that it can protect the entire light stick 14 when the light stick 14 is placed therein in a stored position. A first distal end 24 of the holster 10 is provided with a point 26 (for example by cutting the tubular body 22 at an acute angle to a longitudinal axis thereof, not shown, thereby allowing the holster 10 to be used to penetrate soft material such as earth. A second forward end 28 of the holster 10 is provided with a pair of opposed slots as in 30 fashioned therein and adapted for receiving the belt loops as in 20 of the handle 18 therein. In a particular embodiment the holster 10 could be equipped with a clip of the like (not shown) for fastening the holster 10 to a users belt or other article of clothing (also not shown).

Figure 2:
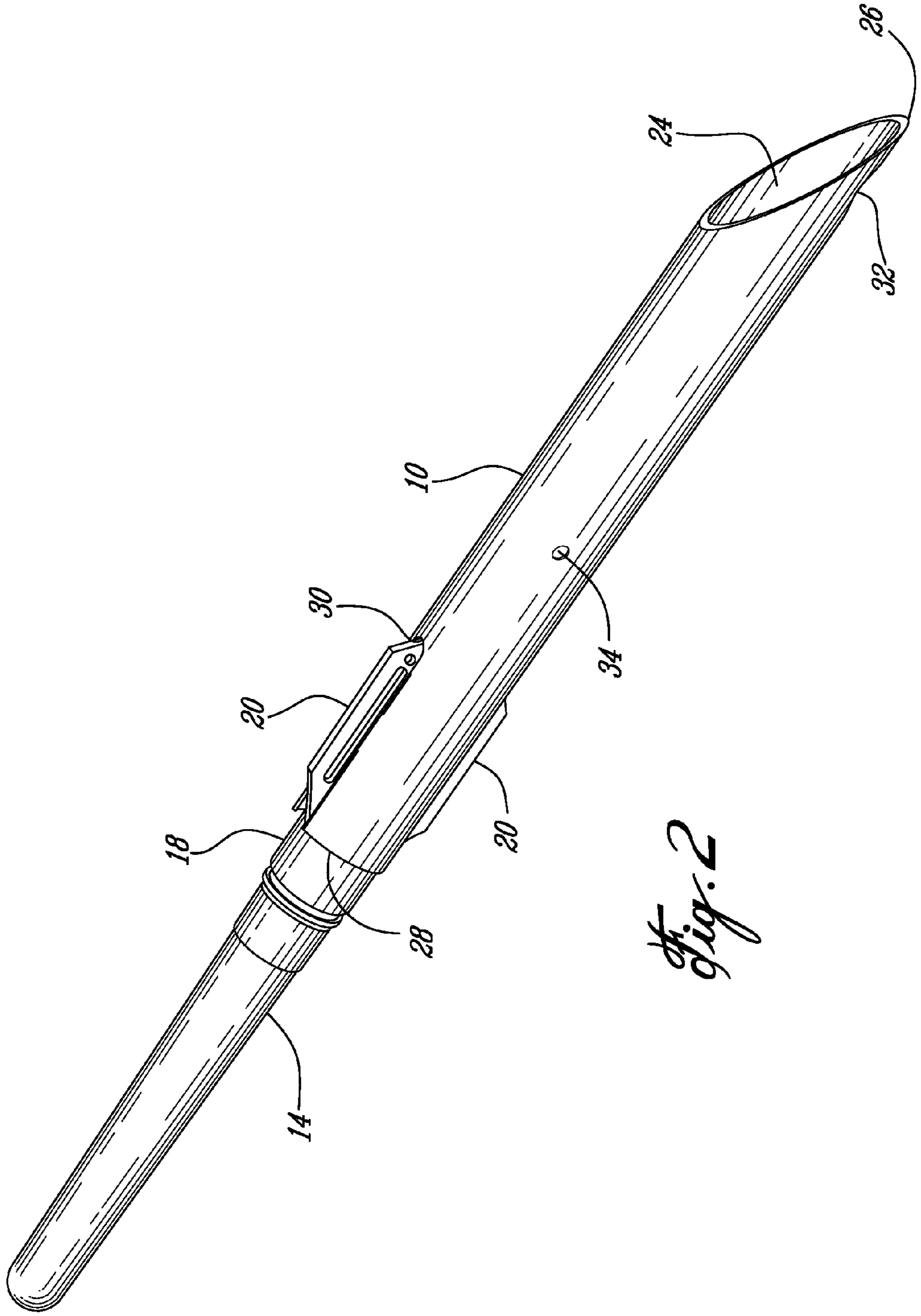
FIG. 2 provides a side plan view of a light stick mounted on one end of the holster in accordance with an illustrative embodiment of the present invention.

Referring now to FIG. 2, in the event that it is required to illuminate an area using the light stick 14, but it is wished to support the light stick 14, for example on the ground or the like, the light stick 14 can be installed on the second end 28 of the holster 10 in a light-emitting position by extracting the light stick 14 from the holster 10, reversing the light stick 14, aligning the belt loops as in 20 with the slots as in 30 and inserting the handle 18 in the second end 28 of the holster 10. Through provision of the point 26, the first end 24 of the holster 10 can then be easily driven into a penetrable material such as earth or sand or the like (not shown). Alternatively, the light stick 14 could first be removed from the holster 10 and the first end 24 of the holster 10 driven into a less penetrable material, for example using a rubber mallet or the heel of a boot or the like (not shown), and the light stick subsequently installed as described above.

Referring back to FIG. 1, a person of skill in the art will now understand that the light stick 14 can be placed into the holster 10 for protection by inserting the lens 16 into the second end 28 of the holster 10 and aligning the belt loops as in 20 with the slots as in 30. The light stick 14 can be secured within the holster for example by inserting a Velcro belt of the like (not shown) through the belt loops as in 20 and tightening.

Still referring to FIG. 1, a first hole, bore or slot 32 can be machined or otherwise formed towards the first end 24 of the holster 10, allowing one or more of the holsters as in 10 to be attached to a rope or karabiner or the like (not shown) for easy carrying if so desired. A pair of opposed second holes or bores 34 can also be machined or otherwise formed through the holster 10 towards a centre thereof, allowing, for example, a nail or screw or the like inserted through the pair of opposed second holes or bores 34 to be used to secure the holster 10 to a tree or wall or the like (also not shown). It will be understood, of course, that the light stick 14 must first be retracted from the holster 10 prior to inserting the nail or screw through the pair of opposed second holes or bores 34. Following installation of the holster 10 on the wall, tree, etc., the light stick 14 can be reversed and reinserted in the holster 10 in the manner as shown in FIG. 2. This would allow, for example, the light stick 14 to be used to illuminate areas much in the manner of a torch or the like.

Still referring to FIG. 1, the light shade 12 is comprised of a hollow elongate tubular body 36 open at a first end 38 and adapted to fit over the lens 16 of the light stock 14. In a first illustrative embodiment, an elongate aperture or slot 40 running the length of the tubular body 36 is provided. The shade 12 is fabricated from a translucent or opaque material and may have reflective material coating an inner surface thereof. In an alternative embodiment of the shade 12 the slot 40 may be replaced by, for example, an arrow, a series of dashes, dots, etc., machined or otherwise formed in the surface of the shade 12. Additionally, or alternatively, the shade 12 may be translucent to increases the glow effect to tinted to change color.

Figure 3:
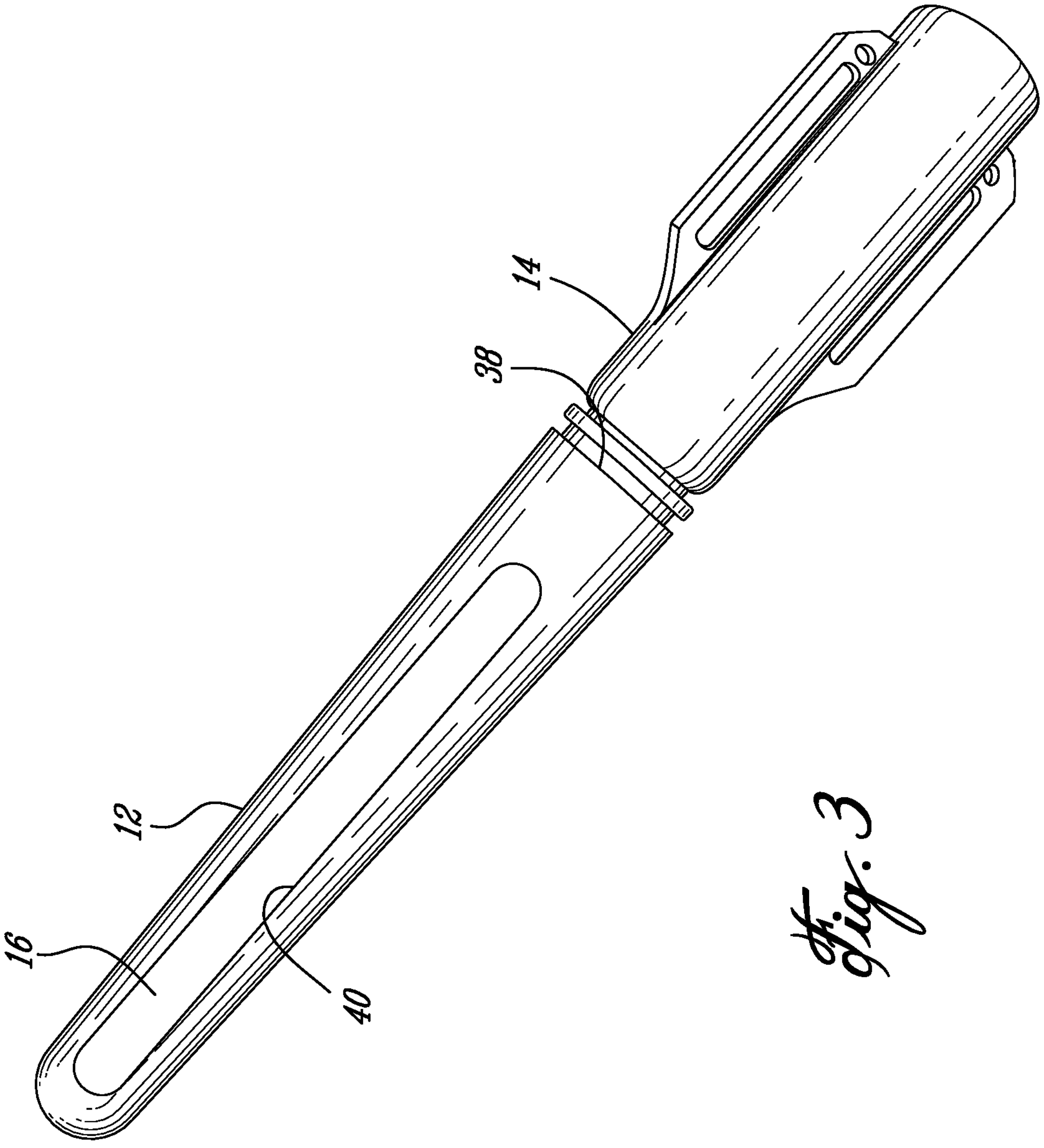
FIG. 3 provides a side plan view of a shade mounted on a light stick in accordance with an illustrative embodiment of the present invention.

Referring now to FIG. 3, the light shade 12 is attached to the light stick 14 by inserting the lens into the open end 38 of the shade 12. Once illuminated, the lens 16 will direct light predominantly via the slot 40, thereby providing for illumination in a particular direction.

Figure 4:
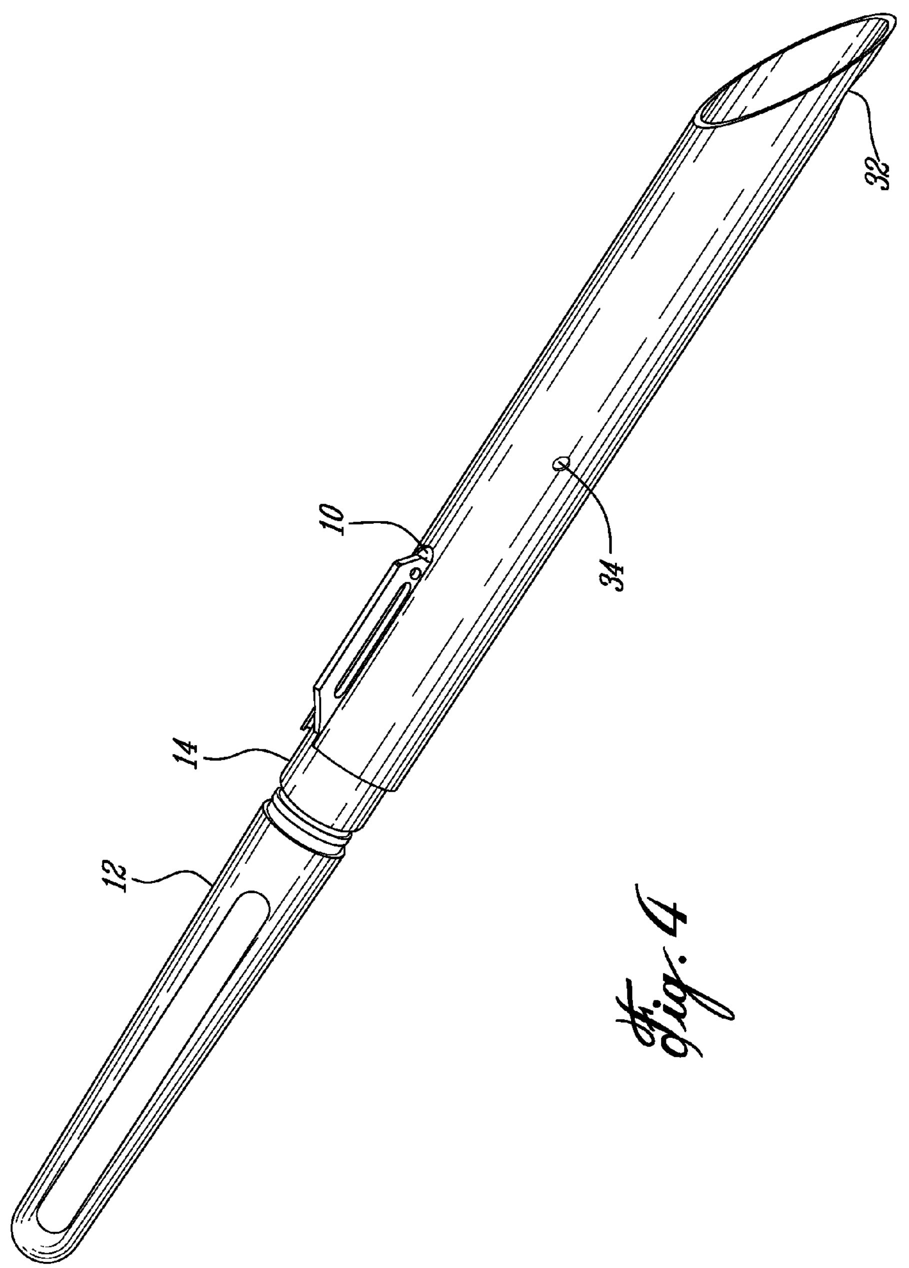
FIG. 4 provides a side plan view of a shade mounted on a light stick mounted on a holster in accordance with an illustrative embodiment of the present invention.

Referring now to FIG. 4, the shade 12 can also be mounted on the light stick 14 which in turn is mounted on the holster 10. A plurality of such assemblies could be used, for example, to illuminate a patch or the like (not shown) in a particular direction.

Although the present invention has been described hereinabove by way of an illustrative embodiment thereof, this embodiment can be modified at will without departing from the spirit and nature of the subject invention.

What is claimed is:

1. A holster for holding a portable battery powered LED light stick providing visual signalling, the light stick comprising a handle portion comprising at least one protuberance and a light emitting tube portion attached to the handle portion, the holster comprising:

- a hollow tubular body open at both a forward end and a rearward end with at said forward end thereof at least one protuberance receiving channel and an opening adapted to receive therein the light stick such that the light stick is retained within said opening at the handle portion in a selected one of both a stored position and a reversed light-emitting position;
- wherein in said stored position each of the at least one protuberance is engaged in a respective one of said at least one channel thereby limiting travel of the handle within said body such that said body is accommodated over the tube portion and in said light-emitting position each of the at least one protuberance is engaged in a respective one of said at least one channel thereby limiting travel of the handle within said body such that the tube portion is exposed and extends away from said forward end.

2. The holster of claim 1, further comprising an open-ended tubular light shade adapted to be fitted over the tube portion when the light stick is in said light-emitting position.

3. The holster of claim 2, wherein said shade comprises an elongate aperture formed on an outer surface of said shade along a length thereof for directing light emitted by the tube portion through said aperture when said shade is fitted over the tube portion.

4. The holster of claim 3, wherein said aperture is selected from the group consisting of a slot, an arrow, a series of dashes and a series of dots.

5. The holster of claim 2, wherein said shade is fabricated from a translucent material.

6. The holster of claim 2, wherein said shade is fabricated from an opaque material.

7. The holster of claim 2, wherein said shade has a reflective material coating on an inner surface thereof.

8. The holster of claim 1, wherein the tube portion comprises a lens surrounding a source of illumination.

9. The holster of claim 8, wherein said source of illumination is powered by a battery housed within the handle portion and further wherein the handle portion comprises a mechanism for selectively activating said source of illumination.

10. The holster of claim 1, wherein the at least one protuberance is a belt loop and the handle portion comprises an opposed pair of the belt loops adapted to receive a fastener therein for securing the light stick within the holster.

11. The holster of claim 10, wherein said at least one channel comprises a slot and said body comprises an opposed pair of said slots extending away from said forward end along a longitudinal axis of said body, each one of said pair of slots adapted to receive therein a corresponding one of said pair of belt loops for retaining the light stick within said opening at the handle portion.

12. The holster of claim 1, further comprising at said rearward end of said body a point for driving the holster into a penetrable material.

13. The holster of claim 12, wherein said point is manufactured by cutting said body at said rearward end at an acute angle to a longitudinal axis of said body.

14. The holster of claim 1, further comprising towards said rearward end of said body a bore for attaching a fastener to the holster for carrying thereof.

15. The holster of claim 1, further comprising towards a centre of said body a pair of opposed bores adapted to receive therein a pair of fasteners for securing the holster to a support.

16. A holder for a portable battery powered LED light stick, the light stick comprising a handle portion comprising at least one protuberance and a light emitting tube portion attached to the handle portion, the holder comprising:

a hollow tubular body open at both a forward end and a rearward end with at said forward end thereof at least one protuberance receiving channel and an opening adapted to receive therein the light stick such that the light suck is retained within said opening at the handle portion in a selected one of both a stored position and a reversed light-emitting position;

wherein in said stored position each of the at least one protuberance is engaged in a respective one of said at least one channel thereby limiting travel of the handle within said body such that said body is accommodated over the tube portion and in said light-emitting position each of the at least one protuberance is engaged in a respective one of said at least one channel thereby limiting travel of the handle within said body such that the tube portion is exposed and extends away from said forward end.

17. The holder of claim 16, further comprising a fastener mounted to said body for attaching the holder and the light stick retained therein to an object.

18. The holder of claim 17, further comprising at a rearward end of said body a bore for attaching said fastener to said body.

19. The holder of claim 17, further comprising towards a centre of said body a pair of opposed bores adapted to receive therein a pair of said fastener.

20. The holder of claim 17, wherein said fastener is selected from the group consisting of a belt loop, a belt, a rope, a karabiner, a nail, and a screw.

21. The holder of claim 16, wherein the at least one protuberance is a belt loop and the handle portion comprises an opposed pair of belt loops adapted to receive a fastener therein for securing the light stick within the holder.

22. The holder of claim 21, wherein said at least one channel corn rises a slot and said body comprises an opposed pair said slots extending away from said forward end along a longitudinal axis of said body, each one of said pair of slots adapted to receive therein a corresponding one of said pair of belt loops for retaining the light stick within said opening at the handle portion.

23. The holder of claim 16, further comprising at a distal end of said body a point for driving the holder into a penetrable material.

24. The holder of claim 23, wherein said point is manufactured by cutting said body at said distal end at an acute angle to a longitudinal axis of said body.

25. A light stick holster kit comprising:

a portable battery powered LED light stick comprising a handle portion comprising at least one protuberance and a light emitting tube portion attached to said handle portion;

a hollow tubular body open at both a forward end and a rearward end with at said forward end thereof at least one protuberance receiving channel and an opening adapted to receive therein said light stick such that said light stick is retained within said opening at said handle portion, said light stick releasably insertable into said opening in a selected one of both a stored position where each of said at least one protuberance is engaged in a respective one of said at least one channel thereby limiting travel of said handle within said body such that said body is accommodated over said tube portion and a reversed light-emitting position where each of said at least one protuberance is engaged in a respective one of said at least one channel thereby limiting travel of the handle within said body such that said tube portion is exposed and extends away from said forward end; and an open-ended tubular light shade adapted to be fitted over said exposed tube portion when said light stick is in said light-emitting position, said shade comprising an elongate aperture formed on an outer surface thereof for directing light emitted by said tube portion through said aperture.

* * * * *